(12) United States Patent
Hosoda et al.

(10) Patent No.: US 9,252,678 B2
(45) Date of Patent: Feb. 2, 2016

(54) POWER CONVERSION APPARATUS

(71) Applicant: DENSO CORPORATION, Kariya-shi, Aichi-pref. (JP)

(72) Inventors: Tsuyoshi Hosoda, Okazaki (JP); Akihiro Yamaguchi, Kariya (JP); Syuji Kurauchi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/613,700

(22) Filed: Feb. 4, 2015

(65) Prior Publication Data
US 2015/0222191 A1 Aug. 6, 2015

(30) Foreign Application Priority Data

Feb. 5, 2014 (JP) ................................. 2014-020654

(51) Int. Cl.
*H02M 7/493* (2007.01)
*H02M 3/337* (2006.01)
*H02M 3/28* (2006.01)
*H02M 1/00* (2007.01)

(52) U.S. Cl.
CPC ............ *H02M 3/3376* (2013.01); *H02M 3/285* (2013.01); *H02M 2001/0032* (2013.01); *H02M 2001/0048* (2013.01)

(58) Field of Classification Search
CPC ....... H02M 3/1584; H02M 7/08; H02M 7/10; H02M 7/153; H02M 7/493; H02M 7/49; H02J 1/102

USPC .................... 363/65, 67, 69, 70, 71
See application file for complete search history.

(56) References Cited

U.S. PATENT DOCUMENTS

| 5,428,523 | A | * | 6/1995 | McDonnal ..................... 363/71 |
| 5,956,245 | A | * | 9/1999 | Rozman ......................... 363/89 |
| 7,212,419 | B2 | * | 5/2007 | Vinciarell ...................... 363/65 |
| 2013/0099559 | A1 | | 4/2013 | Machi et al. |

FOREIGN PATENT DOCUMENTS

| JP | 2002-291247 | 10/2002 |
| JP | 2013-090517 | 5/2013 |

* cited by examiner

*Primary Examiner* — Adolf Berhane
(74) *Attorney, Agent, or Firm* — Nixon & Vanderhye PC

(57) ABSTRACT

A power conversion apparatus is provided which includes a first DC/DC converter and a second DC/DC converter which are connected to each other in parallel, and a controller which changes a state of the second DC/DC converter between operation and stop, based on an input current or an output current of the power conversion apparatus, and at least one current threshold determined based on a first characteristic curve showing a relation between current and conversion efficiency in a state where the second DC/DC converter is stopped while the first DC/DC converter is operated and a second characteristic curve showing a relation between current and conversion efficiency in a state where the first DC/DC converter and the second DC/DC converter are operated.

5 Claims, 5 Drawing Sheets

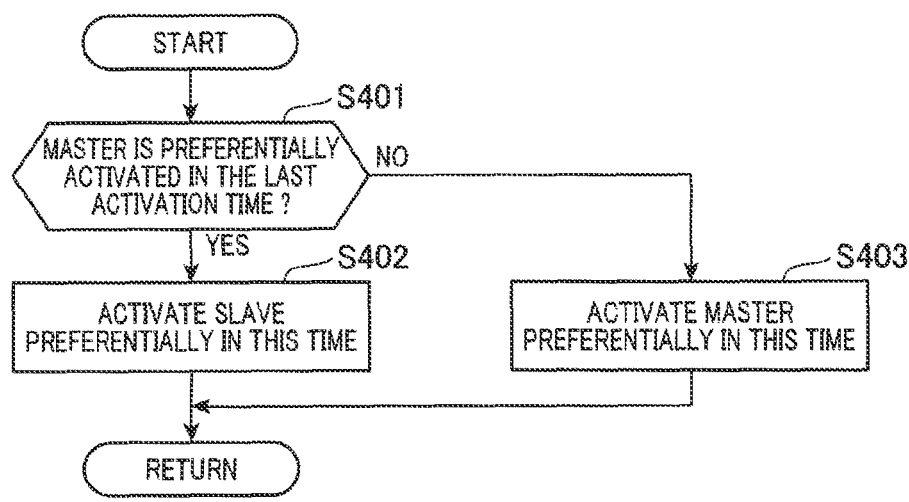
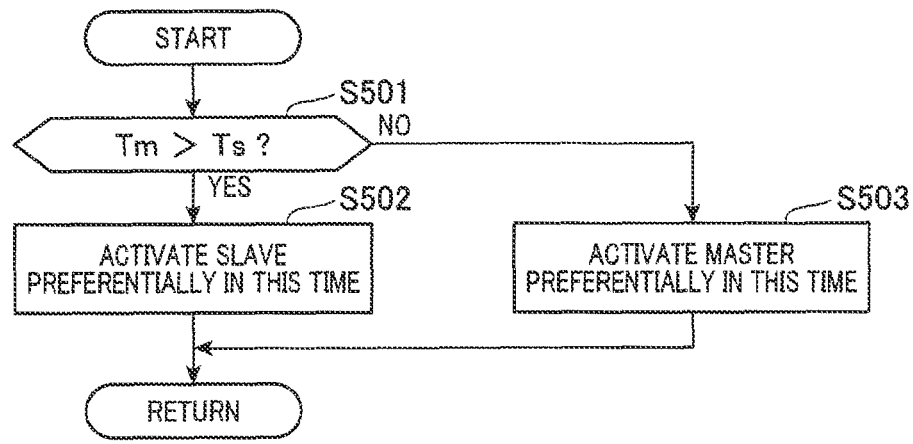

POWER CONVERSION APPARATUS

CROSS-REFERENCE TO RELATED APPLICATION

This application is based on and claims the benefit of priority from earlier Japanese Patent Application No. 2014-20654 filed Feb. 5, 2014, the description of which is incorporated herein by reference.

BACKGROUND

1. Technical Field

The present invention relates to a power conversion apparatus including a plurality of DC/DC converter connected in parallel with each other.

2. Related Art

JP-A-2002-291247 discloses this type of apparatus. This apparatus includes first and second switching power supplies connected to each other in parallel and stops operation of one of the first and second switching power supplies when a load current is lower than a first value.

Specifically, in the above conventional apparatus, a series resistor having resistance R1 is inserted between an output terminal of the first switching power supply (output voltage V1) and one terminal of a load. Similarly, a series resistor having resistance R2 is inserted between an output terminal of the second switching power supply (output voltage V2) and the terminal of the load. In addition, when a load current is equal to or less than a predetermined threshold value, (V1−V2)/R1, while one of the first and second switching power supplies operates, the other of the first and second switching power supplies stops. When the load current is more than the threshold value, the both switching power supplies operate.

SUMMARY

An embodiment provides a power conversion apparatus which realizes highly efficient operation.

As an aspect of the embodiment, a power conversion apparatus is provided which includes: a first DC/DC converter and a second DC/DC converter which are connected to each other in parallel; and a controller which changes a state of the second DC/DC converter between operation and stop, based on an input current or an output current of the power conversion apparatus, and at least one current threshold determined based on a first characteristic curve showing a relation between current and conversion efficiency in a state where the second DC/DC converter is stopped while the first DC/DC converter is operated and a second characteristic curve showing a relation between current and conversion efficiency in a state where the first DC/DC converter and the second DC/DC converter are operated.

BRIEF DESCRIPTION OF THE DRAWINGS

In the accompanying drawings:

FIG. 4 is a flowchart for explaining another example of operation of the power conversion apparatus shown in FIG. 1;

FIG. 5 is a flowchart for explaining another example of operation of the power conversion apparatus shown in FIG. 1;

DETAILED DESCRIPTION OF THE PREFERRED EMBODIMENTS

With reference to the accompanying drawings, hereinafter are described embodiments of the present invention.

Overall Configuration of Electric Power System

Figure 1:
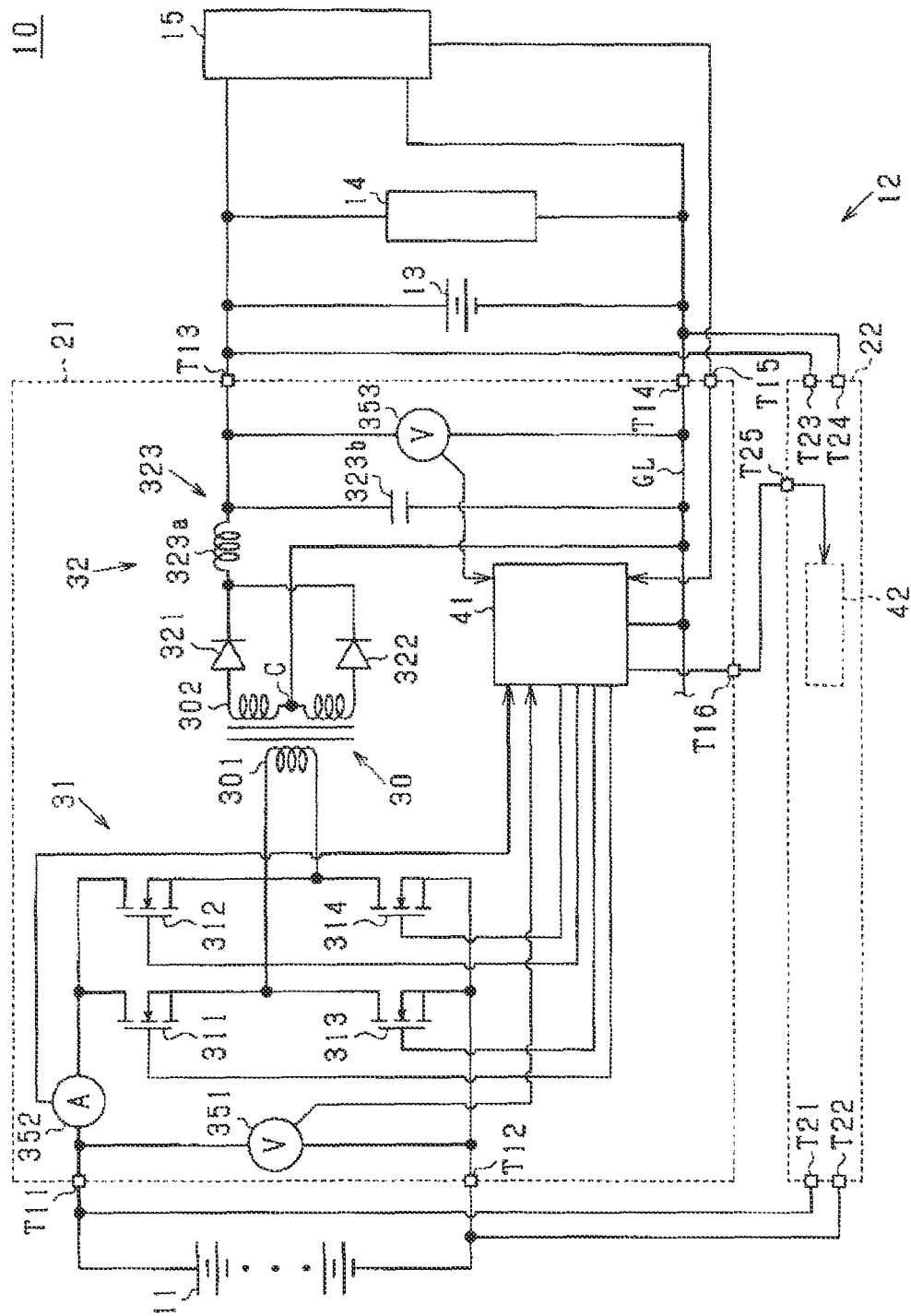
FIG. 1 is a diagram schematically showing a circuit configuration of an electrical power system including a power conversion apparatus according to an embodiment.

An electric power system 10 shown in FIG. 1 is installed in an electrically driven vehicle such as a hybrid automobile. The electric power system 10 includes a high-voltage battery 11, a power conversion apparatus 12, a low-voltage battery 13, an in-vehicle load 14, a vehicle ECU (Electric Control Unit) 15.

The high-voltage battery 11 is secondary battery (e.g. lithium-ion storage battery) configuring a DC power source and can output a predetermined voltage (e.g. 288V) higher than output voltage of the low-voltage battery 13. The power conversion apparatus 12 can convert the high-voltage DC power outputted from the high-voltage battery 11 into DC power having a predetermined low voltage (e.g. 12V).

The power conversion apparatus 12 includes a first converter 21 and a second converter 22 which are DC/DC converters connected in parallel to each other. That is, a high-voltage side input terminal T11 of the first converter 21 is connected to a high-voltage side terminal (positive electrode side terminal) of the high-voltage battery 11. In addition, a low-voltage side input terminal T12 of the first converter 21 is connected to a low-voltage side terminal (negative electrode side terminal) of the high-voltage battery 11. Similarly, a high-voltage side input terminal T21 of the second converter 22 is connected to a high-voltage side terminal of the high-voltage battery 11. In addition, a low-voltage side input terminal T22 of the second converter 22 is connected to a low-voltage side terminal of the high-voltage battery 11.

The low-voltage battery 13, the in-vehicle load 14, and the vehicle ECU 15 are connected to the output side of the power conversion apparatus 12 (in the embodiment, a parallel connection of the first converter 21 and the second converter 22). That is, a high-voltage side output terminal T13 of the first converter 21 and a high-voltage side output terminal T23 of the second converter 22 are connected to the in-vehicle load 14 and a high-voltage side terminal of the vehicle ECU 15. Similarly, a low-voltage side output terminal T14 of the first converter 21 and a low-voltage side output terminal T24 of the second converter 22 are connected to the low-voltage battery 13, the in-vehicle load 14, and a low-voltage side terminal of the vehicle ECU 15.

The low-voltage battery 13 is a secondary battery (e.g. lead-acid storage battery) configuring a DC power source and can output a predetermined voltage (e.g. 12V) lower than output voltage of the high-voltage battery 11. The in-vehicle load 14 is electric equipment (air-conditioning unit, audio equipment, lighting equipment and the like) installed in the electrically driven vehicle and is provided so as to be driven by output of the power conversion apparatus 12 and/or the low-voltage battery 13.

The vehicle ECU 15 is an electronic control unit which performs centralized control for units (including the power conversion apparatus 12 and the in-vehicle load 14) of the electrically driven vehicle and includes a microcomputer having a ROM, a RAM and a CPU therein. The vehicle ECU 15 operates by receiving electric supply from the low-voltage battery 13. That is, the vehicle ECU 15 calculates an output voltage command value of the power conversion apparatus 12 based on an operating condition of the electrically driven vehicle and outputs the output voltage command value to the power conversion apparatus 12.

<Configuration of Power Conversion Apparatus>

Hereinafter, the configuration of the power conversion apparatus 12 is described in detail. In the present embodiment, the power conversion apparatus 12 is configured so that the parallel connection of the first converter 21 operates as a master converter, which is a higher order than the second converter 22, while the second converter 22 operates as a slave converter dependent on the first converter 21.

That is, the first converter 21 has a control input terminal T15 and a control output terminal T16. The control input terminal T15 is provided so as to receive various control signals (including the output voltage command value) outputted from the vehicle ECU 15. The control output terminal T16 is provided so as to output various control signals to the second converter 22. In addition, the second converter 22 has a control input terminal T25. The control input terminal T25 is connected to the control output terminal T16 of the first converter 21.

The first converter 21 is a so-called isolated DC/DC converter and includes a transformer 30, a primary circuit 31, a secondary circuit 32, and a control circuit 41. The second converter 22 is also a so-called isolated DC/DC converter and includes a circuit configuration similar to that of the first converter 21.

Hereinafter, an internal circuit configuration of the first converter 21 is described in detail. Note that the configuration of the second converter 22 is the same as that of the first converter 21 with the exception that the second converter 22 includes a control circuit 42 instead of the control circuit 41. Hence, for the explanation of the internal circuit configuration of the second converter 22, the following explanation of the first converter 21 is appropriately employed unless a technical contradiction arises.

The primary circuit 31 is provided at the primary side of the transformer 30. The secondary circuit 32 is provided at the secondary side of the transformer 30. That is, a primary coil 301 of the transformer 30 is connected the primary circuit 31. A secondary coil 302 of the transformer 30 is connected the secondary circuit 32.

The primary circuit 31 is a so-called full-bridge circuit and includes four switching elements 311 to 314. That is, input terminals of the switching elements 311 and 312 at the high-potential (upper arm) side are connected to a high-voltage side terminal (positive electrode side terminal) of the high-voltage battery 11 via the high-voltage side input terminal T11. Output terminals of the switching elements 313 and 314 at the low-potential (lower arm) side are connected to a low-voltage side terminal (negative electrode side terminal) of the high-voltage battery 11 via the low-voltage side input terminal T12.

In addition, a connection between the switching element 311 and the switching element 313, which are connected to each other in series, is connected to one end of the primary coil 301. A connection between the switching element 312 and the switching element 314, which are connected to each other in series, is connected to the other end of the primary coil 301.

Note that, as shown in FIG. 1, in the present embodiment, N-channel MOS transistors are used as the switching elements 311 to 314. In addition, in each of the switching elements 311 to 314, a free-wheel diode (not shown) is connected between the input terminal (drain) and the output terminal (source). The free-wheel diode may be a parasitic diode of the switching element 311 or the like, or may be externally provided for the switching element 311.

The secondary circuit 32 includes diodes 321 and 322 and a smoothing circuit 323. The anode of the diode 321 is connected to one end of the secondary coil 302. The anode of the diode 322 is connected to the other end of the secondary coil 302. The cathode of the diode 321 and the cathode of the diode 322 are short-circuited. In addition, a center tap C of the secondary coil 302 is connected a ground line GL. The ground line GL is connected to the low-voltage side output terminal T14.

The smoothing circuit 323 is a so-called LC filter and includes a reactor 323a and a capacitor 323b. One end of the reactor 323a is connected to the cathodes of the diodes 321 and 322. The other end of the reactor 323a is connected to the high-voltage side output terminal T13. The capacitor 323b is provided between the other end of the reactor 323a and the ground line GL.

The primary circuit 31 is provided with an input voltage sensor 351 and an input current sensor 352. The secondary circuit 32 is provided with an output voltage sensor 353. The input voltage sensor 351 is provided so as to generate an output corresponding to voltage between the input side terminals of the primary circuit 31 (input voltage: voltage between the high-voltage side input terminal T11 and the low-voltage side input terminal T12). The input current sensor 352 is a so-called current transformer which is interposed between the high-voltage side input terminal T11 and the input terminal of and the switching element 311. The input current sensor 352 is provided so as to generate an output corresponding to the current flowing into the primary circuit 31 (input current). The output voltage sensor 353 is provided so as to generate an output corresponding to the voltage between the terminals of the secondary circuit 32 (output voltage: voltage between the high-voltage side output terminal T13 and the low-voltage side output terminal T14).

In the present embodiment, the control circuit 41, which corresponds to a control section, is an ECU which is a lower order than the vehicle ECU 15, and includes therein a microcomputer including a ROM, a RAM, and a CPU. The ROM previously stores a control program for controlling operation of the electric power system 10, a map (look-up table) which is referred to when executing the control program. The RAM can temporarily store data when the CPU executes the control program. The CPU performs the control program to generate and output various control signals.

In the present embodiment, the control circuit 41 generates and outputs various control signals based on, in addition to input voltage, input current, and output voltage of the first converter 21, an output voltage command value Vc received from the vehicle ECU 15 via the control input terminal T15. That is, the control circuit 41 generates input signals (hereinafter, simply referred to as "PWM control signals") for control terminals (gate terminals) of the switching elements 311 to 314 to output the PWM control signals to the switching elements 311 to 314. In addition, the control circuit 41 generates at least one of an output voltage command value Vc2 and an output current command value Ic2 for the second converter 22 to output the at least one of the output voltage command value Vc2 and the output current command value Ic2 to the control output terminal T16.

The control circuit 42 generates and outputs PWM control signals of the second converter 22 based on, in addition to input voltage, input current, and output voltage of the second converter 22, the output voltage command value Vc2 and/or the output current command value Ic2 received from the control circuit 41 via the control input terminal T25.

<Operation>

Hereinafter, operation by the configuration of the present embodiment is described in addition to features and advantages of the configuration.

The control circuit 41 of the first converter 21 receives the output voltage command value Vc (command value of output voltage Vo from the parallel connection of the first converter 21 and the second converter 22, that is, the power conversion apparatus 12), which is calculated by the vehicle ECU 15 based on the operating condition of the electrically driven vehicle, from the vehicle ECU 15 via the control input terminal T15. In addition, the control circuit 41 obtains input voltage (hereinafter, referred to as "input voltage Vi1") of the first converter 21 based on output of the input voltage sensor 351. Similarly, the control circuit 41 obtains input current (hereinafter, referred to as "input current Ii1") of the first converter 21 based on output of the input current sensor 352. In addition, the control circuit 41 obtains output voltage (hereinafter, referred to as "output voltage Vo1") of the first converter 21 based on output of the output voltage sensor 353.

Next, the control circuit 41 generates the PWM control signals and at least one of the output current command value Ic2 and the output voltage command value Vc2 based on the received output voltage command value Vc and the obtained input voltage Vi1, the input current Ii1, and the output voltage Vo1. The control circuit 41 performs PWM control of the four switching elements 311 to 314 based on the PWM control signals. In addition, the control circuit 41 outputs the generated output current command value Ic2 and/or the output voltage command value Vc2 to the second converter 22 via the control output terminal T16.

As in the case of the control circuit 41 of the first converter 21, the control circuit 42 of the second converter 22 obtains input voltage, input current, and output voltage (hereinafter, referred to as "input voltage Vi2", "input current Ii2", and "output voltage Vo2") of the second converter 22. In addition, the control circuit 42 receives the output current command value Ic2 and/or the output voltage command value Vc2 from the control circuit 41 via the control input terminal T25. Then, the control circuit 42 generates and outputs the PWM control signals of the second converter 22, based on the obtained input current Ii2 and the output voltage Vo2, and the output current command value Ic2 and/or the output voltage command value Vc2 received from the control circuit 41.

That is, in the present embodiment, the control circuit 41 of the first converter 21 serving as the master converter sets target values (command values) of the output voltage Vo2 and output current Io2 of the second converter 22. The control circuit 42 performs PWM control of the second converter 22 based on the target values.

Figure 2:
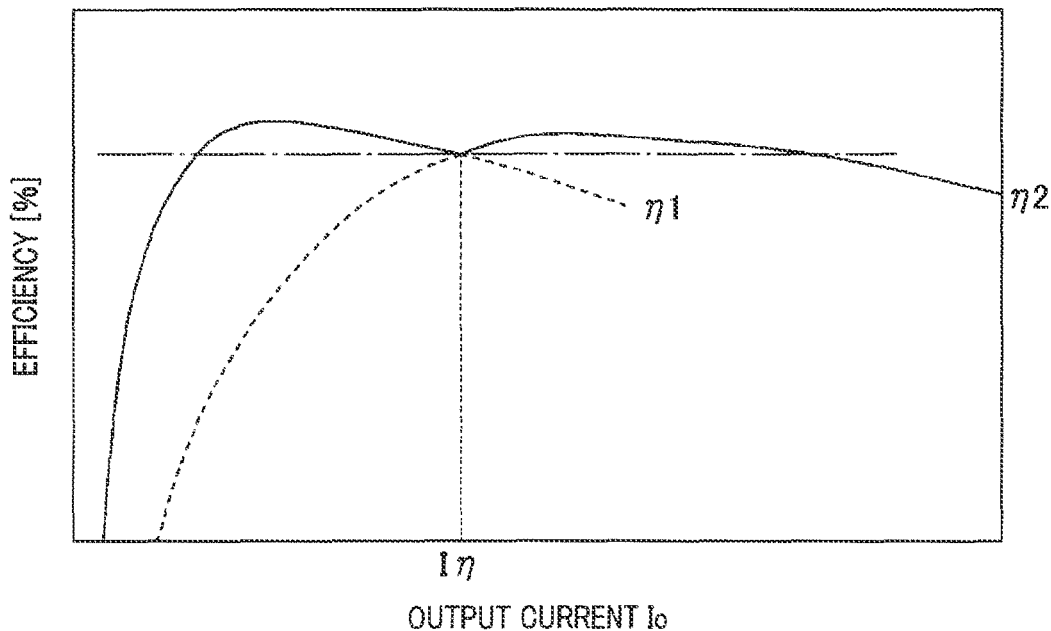
FIG. 2 is a graph for explaining one example of operation of the power conversion apparatus shown in FIG. 1.

In FIG. 2, η1 is a graph showing a relation between the output current Io and power conversion efficiency in a state where only the first converter 21 is operated to perform power conversion (hereinafter, referred to as "slave stop mode"). In addition, η2 is a graph showing a relation between the output current Io and power conversion efficiency in a state where both the first converter 21 and the second converter 22 are operated to perform power conversion so as to output the same current (Io1=Io2=Io/2: hereinafter, referred to as "slave operation mode"). Iη is the output current Io corresponding to the intersection of the curve η1 (first characteristic curve) and the curve η2 (second characteristic curve). Io1 is an output current of the first converter 21. Io2 is an output current of the second converter 22. As a matter of course, the relation Io=Io1+Io2 is established.

Referring to FIG. 2, in the present embodiment, when the output current Io is less than Iη, the control circuit 41 sets the output current command value Ic2 to 0 to make only the first converter 21 perform power conversion (slave stop mode). Conversely, when the output current Io is more than Iη, the control circuit 41 sets the output current command value Ic2 to Io/2=Io1 to make both the first converter 21 and the second converter 22 perform power conversion (slave operation mode). Note that Iη corresponds to a current threshold.

To realize the above operation, the control circuit 41 performs the following operations. (1) In the slave stop mode, when an obtained value Is of the input current Ii1 obtained based on output of the input current sensor 352 provided in the first converter 21 has exceeded a predetermined value Ith1, the control circuit 41 changes the operation mode of the power conversion apparatus 12 from the slave stop mode to the slave operation mode. (2) In the slave operation mode, when the obtained value Is has become less than a predetermined value Ith2, the control circuit 41 changes the operation mode of the power conversion apparatus 12 from the slave operation mode to the slave stop mode.

The predetermined values Ith1 and Ith2 are set as the following expression based on Iη. In the following expression, α is a predetermined value (α>0), and n is a turn ratio of the transformer 30. Ith1 or (Iη+α) corresponds to a first current threshold. Ith2 or (Iη−α) corresponds to a second current threshold.

$$Ith1=(I\eta+\alpha)/n$$

$$Ith2=(I\eta-\alpha)/2n$$

That is, in the present embodiment, the operation mode is changed from the slave stop mode to the slave operation mode at the time when the output current Io reaches (Iη+α) from a value less than Iη. The operation mode is changed from the slave operation mode to the slave stop mode at the time when the output current Io reaches (Iη−α) from a value more than Iη. Accordingly, in the present embodiment, a hysteresis characteristic is applied to the change of the operation mode.

The operation described above is described with reference to a flowchart shown in FIG. 3.

Figure 3:
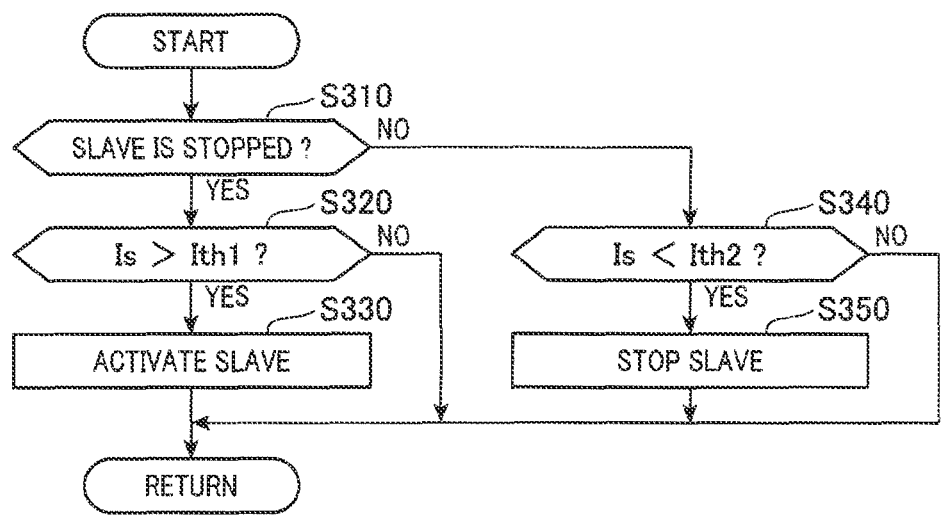
FIG. 3 is a flowchart for explaining one example of operation of the power conversion apparatus shown in FIG. 1.

The CPU of the control circuit 41 repeatedly activates a routine shown in the flowchart of FIG. 3 at predetermined intervals (e.g. 5 msec). When the routine is activated, first, in step S310, the control circuit 41 determines whether or not the current operation mode is the slave stop mode.

If the current operation mode is the slave stop mode (step S310=YES), the process proceeds to step S320, in which the control circuit 41 determines whether or not the obtained value Is of the input current Ii1 has exceeded the predetermined value Ith1. If Is>Ith1 (step S320=YES), the process proceeds to step S330, in which the control circuit 41 activates the second converter 22 (slave converter). That is, the operation mode is changed from the slave stop mode to the slave operation mode. Thereafter, the routine is temporarily halted. Conversely, if Is≤Ith1 (step S320=NO), step S330 is skipped, and the slave stop mode is maintained. Thereafter, the routine is temporarily halted.

If the current operation mode is the slave operation mode (step S310=NO), the process proceeds to step S340, in which the control circuit 41 determines whether or not the obtained value Is of the input current Ii1 is less than the predetermined value Ith2. If Is<Ith2 (step S320=YES), the process proceeds to step S350, in which the control circuit 41 stops the operation of the second converter 22 (slave converter). That is, the operation mode is changed from the slave operation mode to the slave stop mode. Thereafter, the routine is temporarily halted. Conversely, if Is≥Ith2 (step S340=NO), step S350 is skipped, and the slave operation mode is maintained. Thereafter, the routine is temporarily halted.

As described above, according the configuration of the present embodiment, the current threshold is used which is set based on a characteristic of conversion efficiency and current. Hence, as shown by a solid line in FIG. 2, the operation mode is selected which has the highest conversion efficiency with respect to the output voltage Io. Therefore, according to the present embodiment, in the wide operating range from a low power range to a high power range, operation having efficiency significantly higher than that of other conventional apparatuses can be realized.

In addition, according the configuration of the present embodiment, as described above, a hysteresis characteristic is applied to the change of the operation mode. Hence, control hunting due to the changing operation can be effectively prevented.

In addition, according the configuration of the present embodiment, when changing the operation mode, the obtained value Is of the input current Ii1 obtained based on output of the input current sensor 352, which is a current sensor provided in the first converter 21, is used. That is, setting and changing the operation mode can be effectively performed, without detecting the output current Io, which is relatively large current, and providing a series resistor at an output side of the power conversion apparatus as disclosed in JP-A-2002-291247. Hence, according to the present embodiment, energy loss and an increase in manufacturing cost can be effectively prevented.

<Modifications>

Hereinafter, modifications of the embodiment are illustrated. In the following modifications, portions having configurations and functions similar to those described in the above embodiment may be provided with the same reference numerals thereof. For explaining the portions, the explanations in the above embodiment may be appropriately employed within a range where technical contradictions do not arise. In addition, any of the portions of the above embodiment and any or all of the following modifications may be appropriately combined within a range where technical contradictions do not arise.

Instead of the diodes 321 and 322 of the secondary circuit 32, switching elements may be provided. That is, the secondary circuits 32 of the first converter 21 and the second converter 22 may be so-called synchronous rectifier circuits.

The arrangement of the input current sensor 352 is not also limited to the above embodiment. For example, the input current sensor 352 may be provided at the low-voltage side input terminal T12 or between the primary circuit 31 and the primary coil 301. In addition, instead of the obtained value Is of the input current Ii1 obtained based on output of the input current sensor 352 provided in the first converter 21, the output current command value Ic calculated by the vehicle ECU 15 may be used to perform setting and changing the operation mode described above.

In the above embodiment, Ith1=(Iη+α)/n and Ith2=Iη/2n may be established. Ith1=Iη/n and Ith2=(Iη−α)/2n may be established. Alternatively, in the above embodiment, Ith1=(Iη+α)/n and Ith2=(Iη+β)/2n may be established. Ith1=(Iη−α) and Ith2=(Iη−α)/2n may be established (α>β>0, 0<α<γ).

The output voltage Vo1 of the first converter 21 and the output voltage Vo2 of the second converter 22 may be the same or may be different from each other. Similarly, the output rating of the first converter 21 (rated value of the output current Io1) and the output rating of the second converter 22 (rated value of the output current Io2) may be the same or may be different from each other.

When the output rating of the first converter 21 and the output rating of the second converter 22 are different from each other, and the configuration of the above embodiment is used, it is preferable that the output rating of the first converter 21 is lower than the output rating of the second converter 22. That is, operating the first converter 21, whose output rating is lower and whose transformer loss is smaller, in preference to the second converter 22 (earlier than the second converter 22, i.e. making lower output side converter perform output operation) significantly improves power conversion efficiency in a low power range.

The control circuit 41 may change the priority of operation between the first converter 21 and the second converter 22 based on an operation history (the number of activations and/or a period of time of operation). According to the modification, the lifetime of the power conversion apparatus 12 can be extended. FIGS. 4 and 5 are flowcharts concerning the modification.

The routine shown in the flowchart of FIG. 4 is activated by the CPU of the control circuit 41 when the electric power system 10 is activated (when an ignition switch (not shown) provided in the electrically driven vehicle is turned on). If the routine is activated, first, in step S401, the control circuit 41 determines whether or not the first converter 21 (master converter) is operated in preference to the second converter 22 when the electric power system 10 was activated in the last time.

If the first converter 21 is operated in preference to the second converter 22 when the electric power system 10 was activated in the last time (step S401=YES), the process proceeds to step S402. In step S402, when the electric power system 10 is activated in this time, the control circuit 41 sets the operation mode of the power conversion apparatus 12 so that the second converter 22 (slave converter) is operated in preference to the first converter 21. That is, in step S402, the control circuit 41 changes the operation mode of the power conversion apparatus 12 so that only the second converter 22 operates in the low power range while both the first converter 21 and the second converter 22 operate in the high power range, which is an opposite manner to the above embodiment. Thereafter, the routine ends.

If the second converter 22 is operated in preference to the first converter 21 when the electric power system 10 was activated in the last time (step S401=NO), the process proceeds to step S403. In step S403, when the electric power system 10 is activated in this time, the control circuit 41 sets the operation mode of the power conversion apparatus 12 so that the first converter 21 (master converter) is operated in preference to the second converter 22. That is, in step S403, the control circuit 41 changes the operation mode of the power conversion apparatus 12 so that only the first converter 21 operates in the low power range while both the first converter 21 and the second converter 22 operate in the high power range, which is a similar manner to the above embodiment. Thereafter, the routine ends.

When the electric power system 10 is activated, the routine shown in the flowchart of FIG. 5 is activated by the CPU of the control circuit 41. If the routine is activated, first, in step 501, the control circuit 41 compares an accumulated operation time Tm of the first converter 21 with an accumulated operation time Ts of the second converter 22. Note that, in the present modification, the accumulated operation times Tm, Ts have been previously measured and stored in the control circuit 41.

If Tm>Ts (step 501=YES), the process proceeds to step S502. In step S502, when the electric power system 10 is activated in this time, the control circuit 41 sets the operation mode of the power conversion apparatus 12 so that the second converter 22 (slave converter) is operated in preference to the first converter 21. Thereafter, the routine ends.

If Tm≤Ts (step S501=NO), the process proceeds to step S503. In step S503, when the electric power system 10 is activated in this time, the control circuit 41 sets the operation mode of the power conversion apparatus 12 so that the first converter 21 (master converter) is operated in preference to the second converter 22. Thereafter, the routine ends.

As in the case of the above modification, when first DC/DC converter, which is activated on a priority basis (i.e. at the beginning), is changed based on the operation history while the output rating of the first converter 21 and the output rating of the second converter 22 are different from each other, weighting may be applied to the change based on the difference between the output ratings. That is, for example, if the output rating of the first converter 21 is lower than the output rating of the second converter 22, in step 401, a determination may be made whether or not the first converter 21 (master converter) is operated in preference to the second converter 22 when the electric power system 10 was activated in the last time and the time before last. Alternatively, in step 501, a determination of whether Tm>k×Ts or not (k is a constant more than 1) may be made.

The control of changing the operation mode may be performed by, instead of the control circuit 41, the vehicle ECU 15 which is a higher order than the control circuit 41. In this case, similar to the first converter 21 and the control circuit 41, the second converter 22 and the control circuit 42 can receive a control signal from the vehicle ECU 15.

Figure 6:
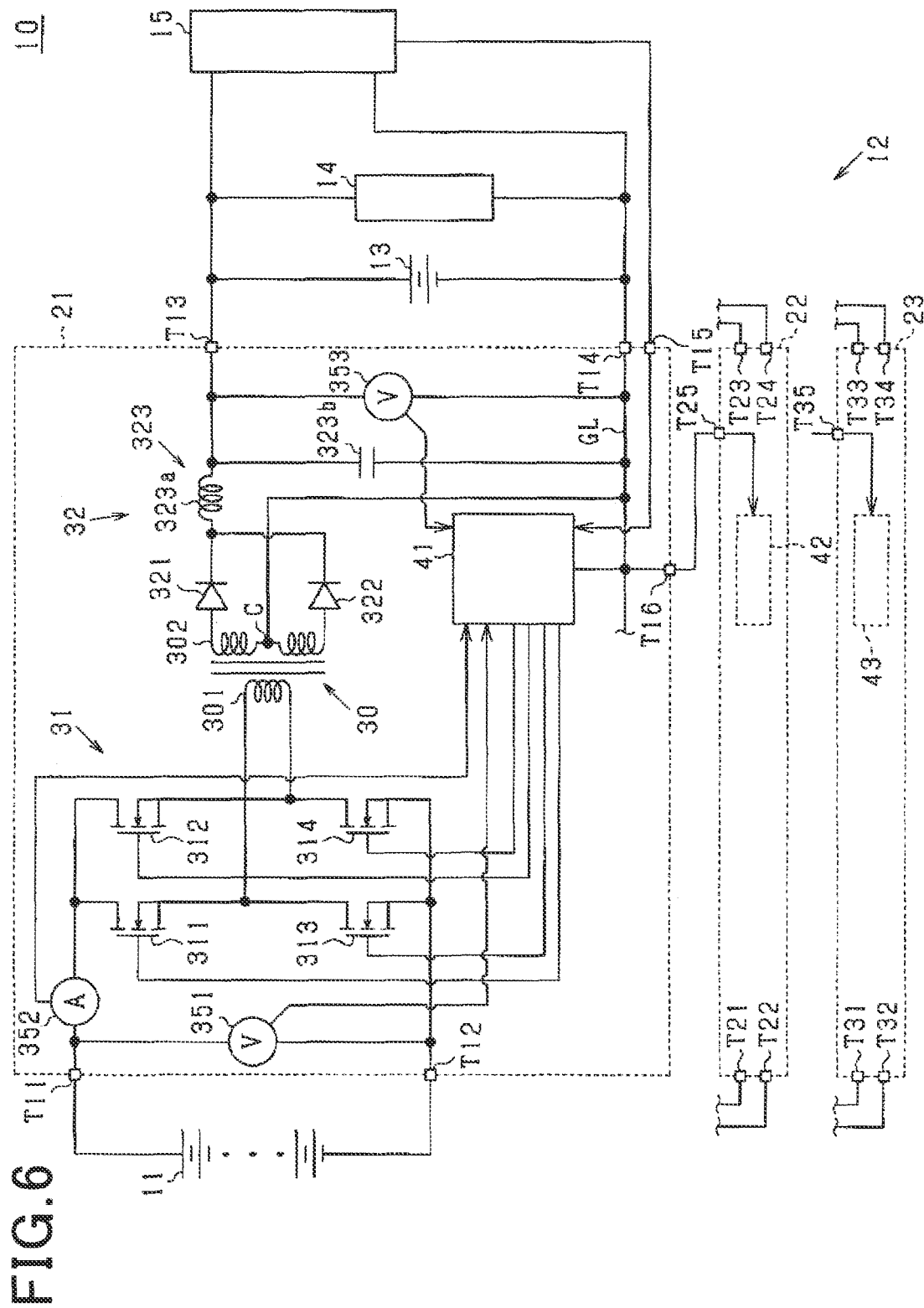
FIG. 6 is a diagram schematically showing a circuit configuration of an electrical power system including a power conversion apparatus according to another embodiment.
Figure 7:
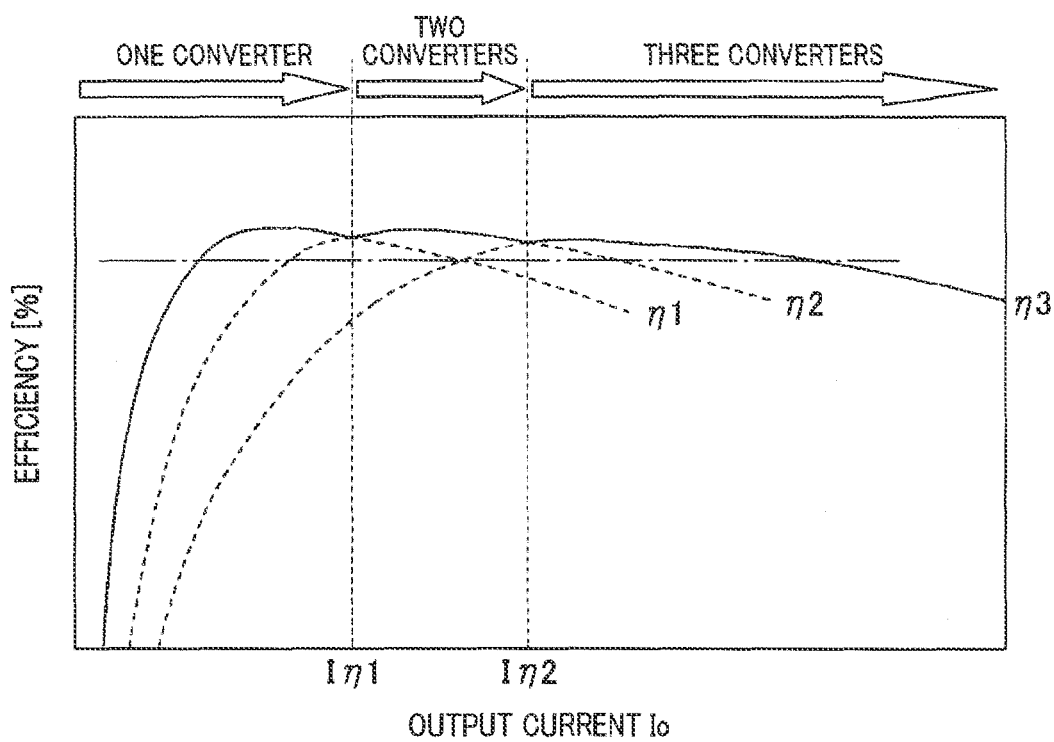
FIG. 7 is a graph for explaining one example of operation of the power conversion apparatus shown in FIG. 6

The power conversion apparatus 12 may include three or more DC/DC inverters which are connected in parallel with each other. FIGS. 6 and 7 correspond to the modification.

For example, as shown in FIG. 6, the power conversion apparatus 12 may be a parallel connection of the first converter 21, the second converter 22, and a third converter 23. In this case, the third converter 23 has a configuration similar to that of the second converter 22. Specifically, the third converter 23 includes a control circuit 43, a high-voltage side input terminal T31, a low-voltage side input terminal T32, a high-voltage side output terminal T33, a low-voltage side output terminal T34, and a control input terminal T35.

In FIG. 7, η1 is a graph showing a relation between the output current Io and power conversion efficiency in a state where only the first converter 21 is operated to perform power conversion. In addition, η2 is a graph showing a relation between the output current Io and power conversion efficiency in a state where both the first converter 21 and the second converter 22 are operated to perform power conversion so as to output the same current (Io1=Io2=Io/2). In addition, η3 is a graph showing a relation between the output current Io and power conversion efficiency in a state where all the first converter 21 to third converter 23 are operated to perform power conversion so as to output the same current (Io1=Io2=Io3=Io/3). Iη1 is the output current Io corresponding to the intersection of the curve η1 and the curve η2. Iη2 is the output current Io corresponding to the intersection of the curve η2 and the curve η3.

Also in the present modification, as shown by a solid line in FIG. 7, the operation mode is selected which has the highest conversion efficiency with respect to the output voltage Io. Therefore, according to the present modification, in the wide operating range from a low power range to a high power range, operation having efficiency significantly higher than that of other conventional apparatuses can be realized.

Note that, as shown in FIG. 6, when three DC/DC converters are arranged in parallel, the manner of changing the number of DC/DC converters to be operated is not limited to the above example (one←→two←→three). That is, when increasing and/or decreasing the number of DC/DC converters to be operated, the number of DC/DC converters to be operated may be changed between one and three (all). Specifically, the number of DC/DC converters to be operated may be changed in such a manner, one→two→three→one, or one→three→two→one. Such a change of the number of DC/DC converters to be operated can be appropriately selected depending on the operating state and/or the specifications (output ratings of the DC/DC converters and the like) of the electric power system 10, that is, the electrically driven vehicle. Even when four or more DC/DC converters are arranged in parallel, the number of DC/DC converters is changed in a similar manner.

In the above embodiment and the modifications, the first converter 21 including groups of the transformer 30, the primary circuit 31 and the secondary circuit 32 and the like are arranged in parallel. However, the present invention may be appropriately applied to a configuration other than the above specific circuit configuration. For example, in FIGS. 1 and 6, the circuit configuration of the first converter 21 and the circuit configuration of the second converter 22 may be provided in parallel between the high-voltage side input terminal T11 and low-voltage side input terminal T12, and the high-voltage side output terminal T13 and the low-voltage side output terminal T14.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, a power conversion apparatus (12) is provided which includes: a first DC/DC converter (21) and a second DC/DC converter (22) which are connected to each other in parallel; and a controller (41) which changes a state of the second DC/DC converter between operation and stop, based on an input current or an output current of the power conversion apparatus, and at least one current threshold determined based on a first characteristic curve showing a relation between current and conversion efficiency in a state where the second DC/DC converter is stopped while the first DC/DC converter is operated and a second characteristic curve showing a relation between current and conversion efficiency in a state where the first DC/DC converter and the second DC/DC converter are operated.

According to the power conversion apparatus, the current threshold for changing the number of DC/DC converters to be operated, including the first DC/DC converter and the second DC/DC converter connected to each other in parallel, is determined based on the first characteristic curve showing a relation between current and conversion efficiency in a state where the second DC/DC converter is stopped while the first DC/DC converter is operated and the second characteristic curve showing a relation between current and conversion efficiency in a state where the first DC/DC converter and the second DC/DC converter are operated. Hence, according to the configuration, operation having efficiency significantly higher than that of other, conventional, apparatuses can be realized.

What is claimed is:

1. A power conversion apparatus, comprising:
a first DC/DC converter and a second DC/DC converter which are connected to each other in parallel; and
a controller which changes a state of the second DC/DC converter between operation and stop, based on an input current or an output current of the power conversion apparatus, and at least one current threshold determined based on a first characteristic curve showing a relation between current and conversion efficiency in a state where the second DC/DC converter is stopped while the first DC/DC converter is operated and a second characteristic curve showing a relation between current and conversion efficiency in a state where the first DC/DC converter and the second DC/DC converter are operated.

2. The power conversion apparatus according to claim 1, wherein
the first DC/DC converter includes a transformer, a primary circuit provided at a primary side of the transformer, and a secondary circuit provided at a secondary side of the transformer,
the primary circuit includes a current sensor which generates an output corresponding to an input current of the first DC/DC converter, and
the controller changes the state of the second DC/DC converter between operation and stop based on a current value obtained by the current sensor.

3. The power conversion apparatus according to claim 1, wherein
the at least one current threshold of the controller includes a first current threshold for changing the state of the second DC/DC converter from stop to operation and a second current threshold for changing the state of the second DC/DC converter from operation to stop.

4. The power conversion apparatus according to claim 1, wherein
the power conversion apparatus includes a plurality of DC/DC converters, any two of which serve as the first DC/DC converter and the second DC/DC converter, and
the controller sets, based on an output rating, one of the plurality of DC/DC converters as the first DC/DC converter.

5. The power conversion apparatus according to claim 1, wherein
the controller sets, based on an operation history, one of the plurality of DC/DC converters as the first DC/DC converter.

* * * * *